US008453948B2

(12) United States Patent
Altaii

(10) Patent No.: US 8,453,948 B2

(45) Date of Patent: Jun. 4, 2013

(54) INVERTED-SPRINKLER SYSTEM: BASE AND SUPPORT

(76) Inventor: Karim Altaii, Harrisonburg, VA (US)

(*) Notice: Subject to any disclaimer, the term of this patent is extended or adjusted under 35 U.S.C. 154(b) by 665 days.

(21) Appl. No.: 11/906,258

(22) Filed: Oct. 1, 2007

(65) Prior Publication Data

US 2008/0083839 A1 Apr. 10, 2008

Related U.S. Application Data

(60) Provisional application No. 60/849,339, filed on Oct. 4, 2006.

(51) Int. Cl.

| | |
|---|---|
| ***B05B 15/06*** | (2006.01) |
| *F16M 11/00* | (2006.01) |
| *F16M 11/32* | (2006.01) |

(52) U.S. Cl.

USPC ........ 239/281; 239/273; 239/280; 239/280.5; 248/157; 248/419; 248/425; 248/163.2; 248/431

(58) Field of Classification Search

USPC ....... 239/200, 201, 276–280, 280.5; 278/152, 278/419, 425, 177.1; 248/75–93, 157, 419, 248/425, 163.1–163.2, 431, 176.1–187.1

See application file for complete search history.

(56) References Cited

U.S. PATENT DOCUMENTS

| | | | | |
|---|---|---|---|---|
| 180,007 | A * | 7/1876 | Copping | 239/275 |
| 539,657 | A * | 5/1895 | Van Horn et al. | 239/231 |
| 872,469 | A * | 12/1907 | Snell | 248/82 |
| 912,894 | A * | 2/1909 | Ryan | 248/84 |
| 973,810 | A * | 10/1910 | Regan | 248/88 |
| 1,512,581 | A * | 10/1924 | Deming | 248/75 |
| 1,959,886 | A | 5/1934 | Wadsworth | |
| 2,590,400 | A * | 3/1952 | Gollnick | 239/166 |
| 2,694,600 | A | 11/1954 | Richey | |
| 2,852,307 | A * | 9/1958 | Clark | 239/276 |
| 2,986,364 | A * | 5/1961 | Vestal | 248/75 |
| 2,997,242 | A * | 8/1961 | Grosholz | 239/281 |
| 3,113,723 | A * | 12/1963 | Arnt | 239/29 |
| 3,286,927 | A * | 11/1966 | Zysk | 239/23 |
| 3,915,382 | A * | 10/1975 | Davis | 239/195 |
| 4,245,786 | A | 1/1981 | Abrahamsen et al. | |
| 4,529,156 | A * | 7/1985 | Heuer | 248/87 |
| 4,824,020 | A | 4/1989 | Harward | |
| 4,860,954 | A | 8/1989 | Allemann | |
| D303,283 | S | 9/1989 | Best et al. | |
| 4,884,749 | A | 12/1989 | Ruprechter | |
| 4,907,742 | A | 3/1990 | Whitehead et al. | |
| 4,978,070 | A | 12/1990 | Chow | |
| 5,307,993 | A | 5/1994 | Simonetti et al. | |
| D378,399 | S | 3/1997 | Simonetti et al. | |
| 5,836,516 | A * | 11/1998 | Van Epps et al. | 239/280.5 |
| 6,322,027 | B1 | 11/2001 | Hsu | |
| 7,252,246 | B2 | 8/2007 | Heren et al. | |
| 2003/0062424 | A1 * | 4/2003 | McKinney et al. | 239/14.2 |
| 2004/0188540 | A1 * | 9/2004 | Mills | 239/280 |
| 2007/0051829 | A1 | 3/2007 | Griffin | |

* cited by examiner

*Primary Examiner* — Len Tran

*Assistant Examiner* — Viet Le

(74) *Attorney, Agent, or Firm* — Daniel L. Fitch

(57) ABSTRACT

An adjustable inverted-sprinkler system for irrigation. The system includes a sprinkler support base fashioned to accept and retain plurality of sprinklers in a generally inverted orientation. The sprinkler support base is supported by a frame having adjustable vertical, horizontal and slanted support members to allow precise direct, efficient and uniform watering from above. The frame is coupled to a base which allows it to be securely grounded during use and quickly moved as needed by the user.

8 Claims, 14 Drawing Sheets

INVERTED-SPRINKLER SYSTEM: BASE AND SUPPORT

CROSS REFERENCE TO RELATED APPLICATION

PROVISIONAL PATENT APPLICATION NO. 60849339 FILED: Oct. 4, 2006.

FEDERALLY SPONSORED RESEARCH

Not Applicable.

SEQUENCE LISTING PROGRAM

Not Applicable.

BACKGROUND OF THE INVENTION

1. Field of Invention

This invention relates in general to an inverted-sprinkler system for inverting and elevating water sprinklers. Inversion of the sprinklers, as shown and described herein, means turning the sprinkler upside down and securing it from an elevated position above the ground such that fluid is directed from above to the desired coverage area below, much like natural rainwater. The invention is directed, in particular, to a base and support structure that elevates and inverts an oscillating wave-type sprinkler, a rotary-type sprinkler, a pulsating type sprinkler, an impulse-type sprinkler, and a plurality of other sprinklers for the efficient and uniform distribution, from above, of any fluid that is to be dispensed over a particular surface or coverage area.

2. Prior Art

The effective sprinkler coverage area of residential and commercial irrigation systems is often reduced by growing crops, vines, shrubbery, trees and other natural and man-made obstacles which interfere with the stream of water ejected by the sprinkler. There are any number of commercially available sprinklers utilized in such irrigation systems. Oscillating sprinklers, for example, are commonly used to cover square or rectangular coverage areas. Typical oscillating wave-type sprinklers are described in U.S. Pat. No. 4,860,954 issued to Allemann (1989); U.S. Pat. No. 4,252,246 B2 issued to Heren, et al. (1981); U.S. Pat. No. 4,245,786 issued to Abrahamsen (1981); and U.S. Pat. No. D303,283 issued to Best, et al. (1989). Rotary sprinklers are commonly used to cover circular or elliptical coverage areas. Typical rotary sprinklers are described in U.S. Pat. No. 5,307,993 issued to Simmonetti (1994) and U.S. Pat. No. D378,399 issued to Simmonetti (1997). Pulsating sprinklers are commonly used to cover circular, angular, or elliptical coverage areas. Typical pulsating sprinklers are described in U.S. Pat. No. 4,978,070 issued to Chow (1990). Impulse sprinklers are also commonly used to cover circular, angular, or elliptical coverage areas. Typical impulse sprinklers are described in U.S. Pat. No. 4,907,742 issued to Whitehead and Ferguson (1990). Sprinklers are typically positioned on the ground in the center of the sprinkler coverage area. In the case of the oscillating wave-type sprinkler, locking devices are provided to restrict the coverage area by restraining the lateral movement of the sprinkler head, by having a pattern select feature (Heren and Breedlove, U.S. Pat. No. 7,252,246 B2 (2007)) or a sprinkler with perforated spray hose that is selectively flexed to produce a variable water spray pattern (Abrahamsen and Spector, U.S. Pat. No. 4,245,786 (1981)). In the case of pulsating and impulse sprinklers, deflectors are provided to minimize or maximize coverage areas by restraining the rotational limits of the sprinkler head.

A number of devices have been suggested to elevate the sprinkler above the level of the ground in order to allow the stream of water to pass without obstruction over vertical obstacles. Most such devices are sprinkler stands of some form which elevate the sprinkler above ground level to an appropriate height where fluid leaving the sprinkler is no longer blocked.

Inventors have created several types of sprinkler stands to maintain a sprinkler in an elevated position. Adequate for overcoming obstacles which block the delivery of water, these devices nonetheless have limited utility in achieving sprinkler coverage area patterns specific to the need of the residential or commercial gardener and others desiring to use sprinklers to deliver fluid to precise coverage areas.

U.S. Pat. No. 4,824,020 to Harward (1989), for instance, discloses a lightweight vertical support stand for a water sprinkler head. The invention has flexible elongated legs which are pivotally attached to a support hub. This invention is an improvement on earlier stands, such as U.S. Pat. No. 1,959,886 to Wadsworth (1934) and U.S. Pat. No. 2,694,600 to Richey (1954) which taught elevated tripod sprinkler stands with bases of varying stability, weight, and mobility. U.S. Pat. No. 4,884,749 issued to Ruprechter, (1989) teaches a swingable mount which tends to orient the sprinkler on nonlevel ground by the force of gravity. It has the advantage of optimizing sprinkler coverage area on nonlevel ground. Other than addressing the vertical limitations of watering nonlevel ground, however, it does little to overcome more typical vertical obstacles such as shrubs, vines, growing crops, and the like.

U.S. Pat. No. 6,322,027 issued to Hsu (2001) discloses yet another adjustable sprinkler stand, including a sprinkler mount which is supported by three adjustable support rod sets. A principal objective of the device is to elevate the sprinkler by means of the three adjustable support rods which can be set to various heights.

In all of these devices, the primary objective was to vertically elevate a water sprinkler head to reduce interference with the sprinkler coverage area caused by vertical obstacles.

United States Patent Application Publication No. US2007/0051829 A1 (Griffin, Mar. 8, 2007) discloses a stand for an oscillating wave-type sprinkler. The stand holds an oscillating wave-type sprinkler in an elevated and generally vertical orientation to provide desired sprinkler coverages. The device is limited to use with oscillating wave-type sprinklers and does not teach the complete inversion of the sprinkler to achieve the type of direct downward spray coverage areas taught by this invention.

Each of the foregoing inventions suffers from a number of common disadvantages.

a) The primary objective of the devices is limited to maintaining the sprinkler in an elevated position.

b) None of the devices allow for the full inversion of the sprinkler from an elevated position.

c) All of the devices direct the pressure of water leaving the sprinkler up from the surface in some fashion before gravity pulls the stream back toward the ground.

d) None of the devices teach the simultaneous elevation and complete inversion of the sprinkler head to achieve desired fluid coverage from above.

e) None of the devices teach the use of sprinkler stands to direct water leaving the sprinkler directly down to the ground.

f) Not all of the devices are able to achieve uniform and efficient watering because they spray water into the air, where it falls to the ground after the stream reaches its apogee, sometimes blowing beyond the desired coverage area, rather than spraying the water directly from above toward the ground.

g) None of the devices mimic natural rainfall by providing an elevated sprinkler which is inverted such that fluid is directly applied to the coverage area from above.

h) None of the devices have the variety of horizontal, vertical, and angular adjustments as does the present invention.

i) None of the devices allow the elevation and inversion of a plurality of sprinkler types (e.g. wave, rotary, oscillating, pulsating, impulse, etc.).

OBJECTS AND ADVANTAGES

Accordingly, the clear objects and advantages of the present invention are:

a) To provide an inverted-sprinkler system which simultaneously elevates and inverts the sprinkler to achieve desired fluid coverage areas.

b) To provide a vertical support member, adjustable in length, to elevate a horizontal support member, also adjustable in length, upon which a sprinkler base is attached for sprinkler inversion.

c) To provide for desired irrigation coverage areas by inverting a plurality of sprinkler types for direct fluid application from above.

d) To provide for portability and stability of the system by means of a plurality of support bases.

e) To provide for the adjustment of the vertical height and horizontal reach of the sprinkler base support by means of telescopic adjustment.

f) To provide for the adjustment of the angle between the vertical support member and horizontal support member by means of a slanted support member with telescopic adjustment.

g) To provide a sprinkler base support with fastening means for the inverted support of a plurality of sprinklers.

h) To provide for the further fine adjustments of the vertical and horizontal support members by means of rotational movement of each support member along its axis.

i) To provide for the further fine adjustment of the angle of the sprinkler support base to the horizontal support member by means of adjustment screws.

j) To couple the invention to a hose timer to facilitate automatic dispensing of fluid.

Further objects and advantages are to provide an inverted-sprinkler system which can be used easily and conveniently to irrigate residential and commercial lawns, gardens, row crops, greenhouses, nurseries, and the like; to allow for the quick and portable transport and movement of the vertical sprinkler system; to save watering time; to conserve water use through direct application; to easily remove, disassemble and store the system; to allow for the precise application of fluids to the desired sprinkler coverage area; to mimic natural rainfall by delivering water from an elevated source; to achieve uniform and rain-like watering of plants; and to function in outdoor and indoor settings.

SUMMARY

In accordance with the present invention an inverted-sprinkler system comprising an adjustable vertical support member secured to a sprinkler system base, said vertical support member able to rotate axially; an adjustable horizontal support member, also able to rotate axially; said vertical and horizontal support members pivoting about a pin to form a right angle; a slanted support member attached to the horizontal and vertical support members near the pivot pin to allow for the adjustment of the angle between said horizontal and vertical support members; a sprinkler support base attached to the distal end of said horizontal support member to secure and permit the inversion of a plurality of sprinklers, the angle of said sprinkler support base to the horizontal support member being adjustable; for the direct and elevated application of water and other fluids (e.g. fertilizer, herbicide) to the desired sprinkler coverage area.

DRAWINGS—FIGURES

FIG. 1—Shows an isometric view of inverted-sprinkler system: base and support.

FIG. 2—Shows an exploded isometric view of inverted-sprinkler system: base and support.

DETAILED DESCRIPTION

Figure 1:
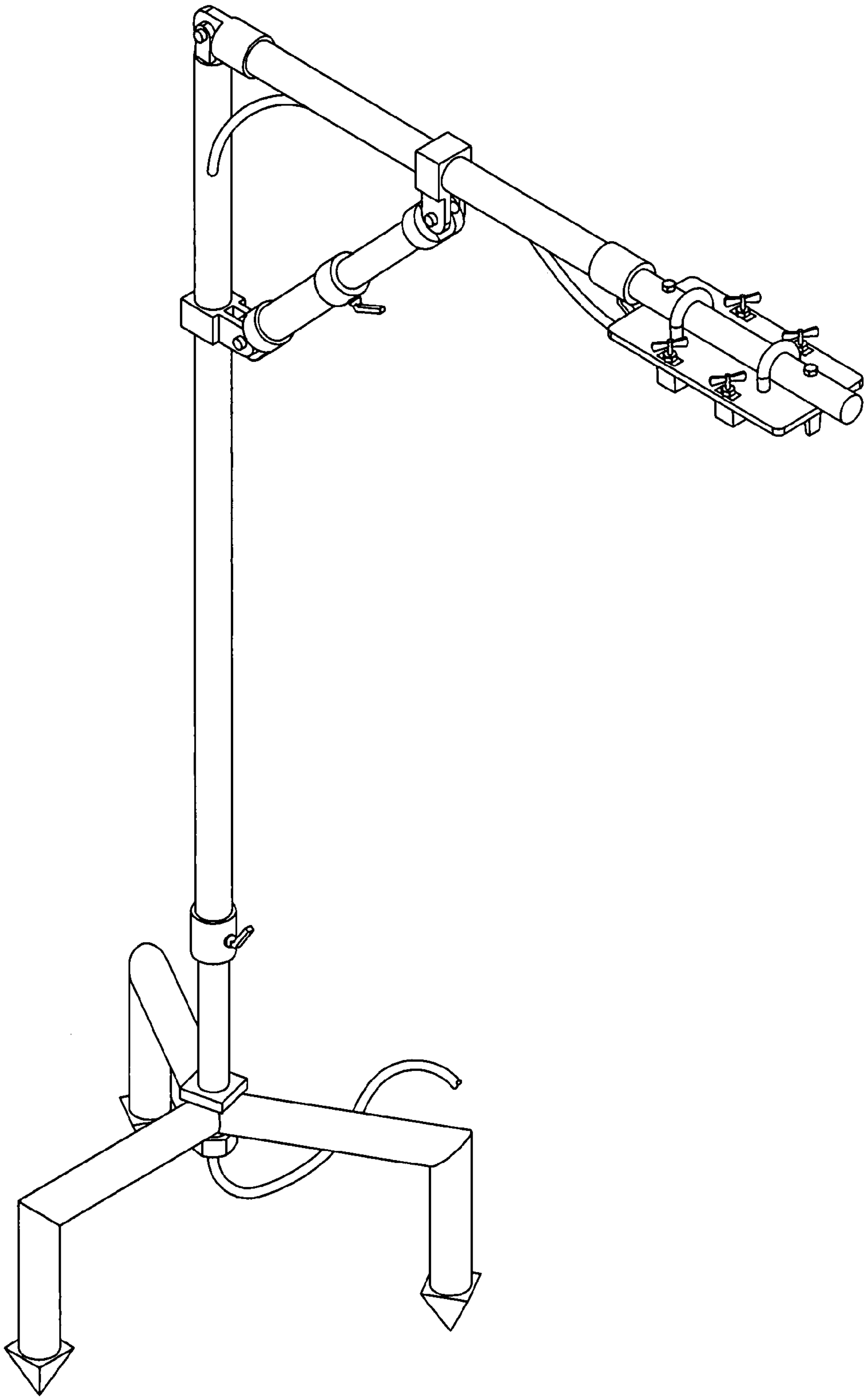
Figure 2:
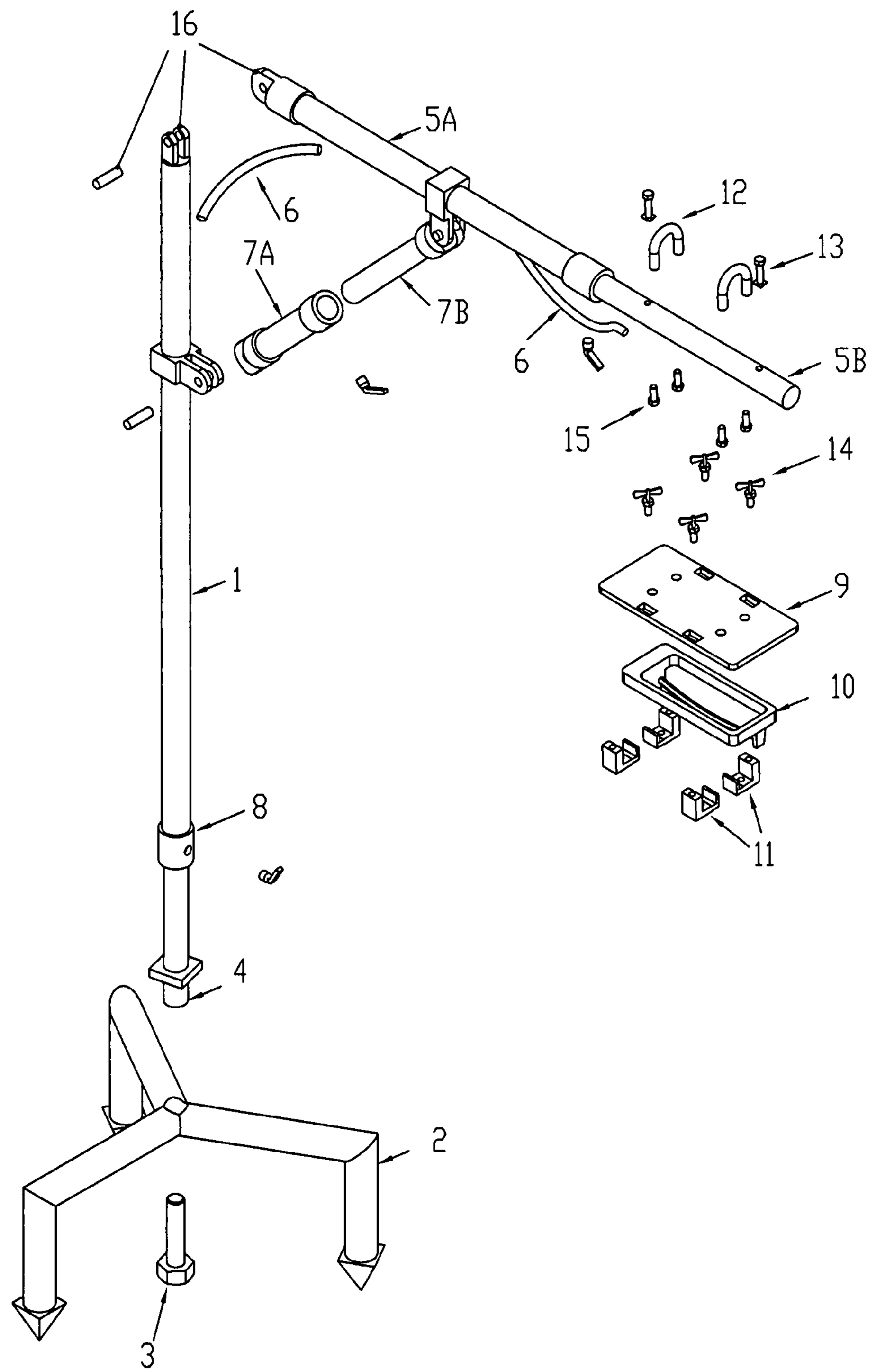
Figure 3:
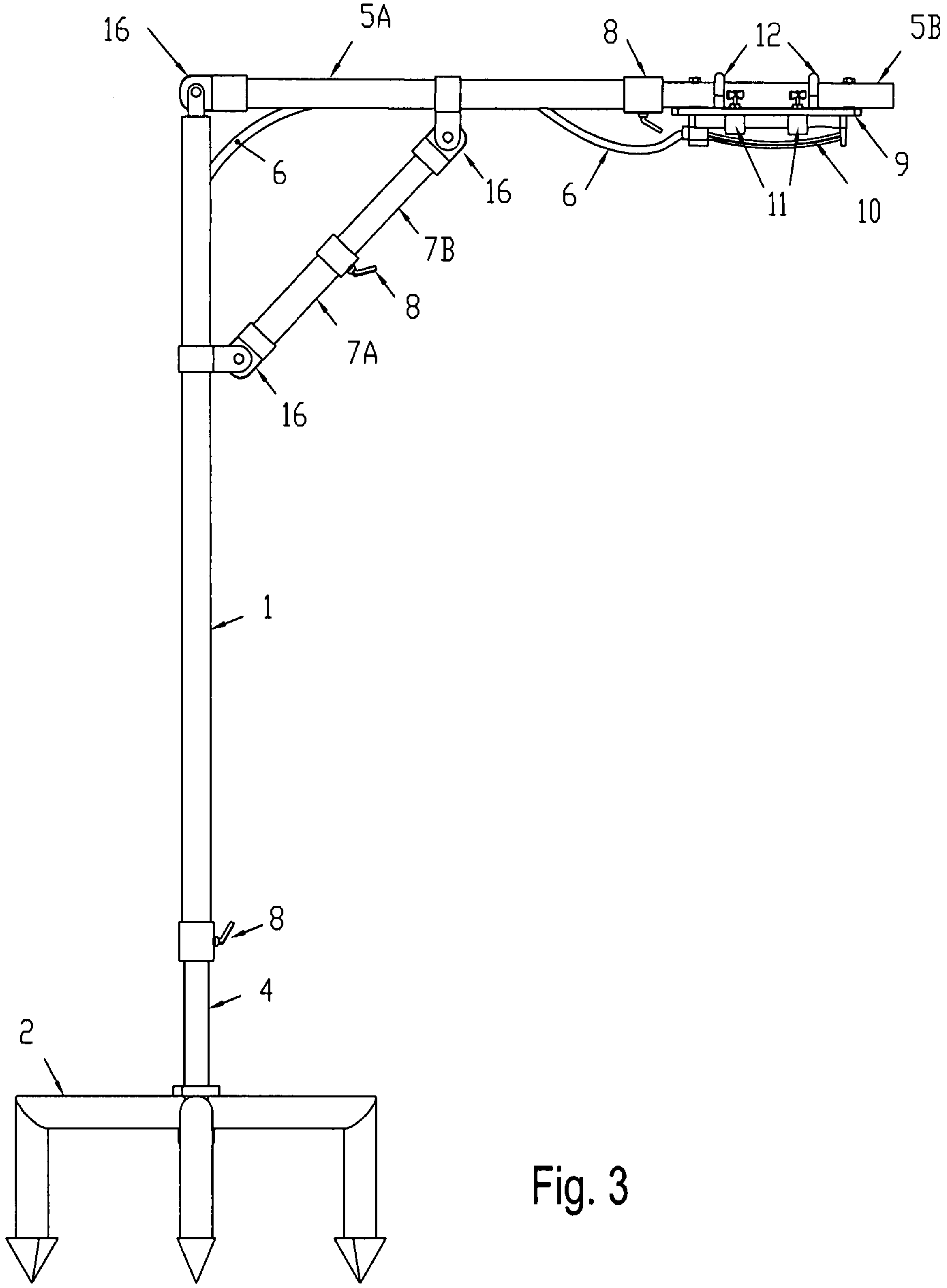
FIG. 3 shows a side view of the inverted-sprinkler system: base and support.
Figure 4:
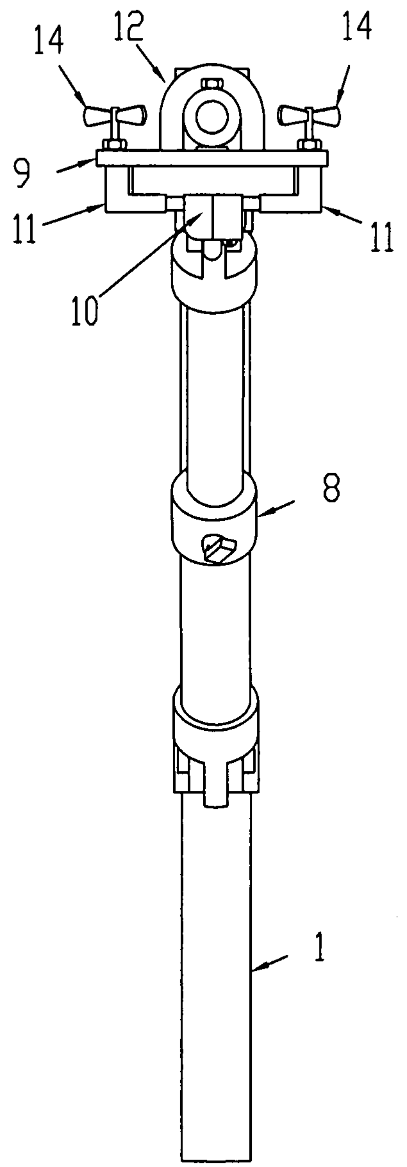
FIG. 4 shows a front view of the inverted-sprinkler system.
Figure 5:
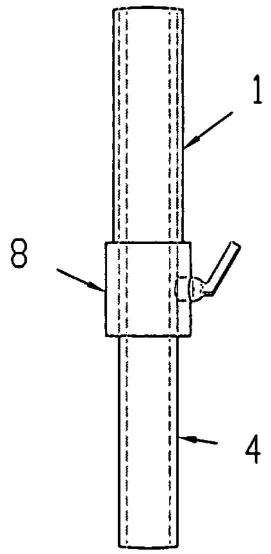
FIG. 5 shows a side view the adjustable vertical support member at the telescopic locking device.
Figure 6:
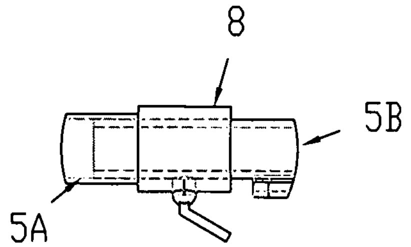
FIG. 6 shows a side view the adjustable horizontal support member at the telescopic locking device.
Figure 7:
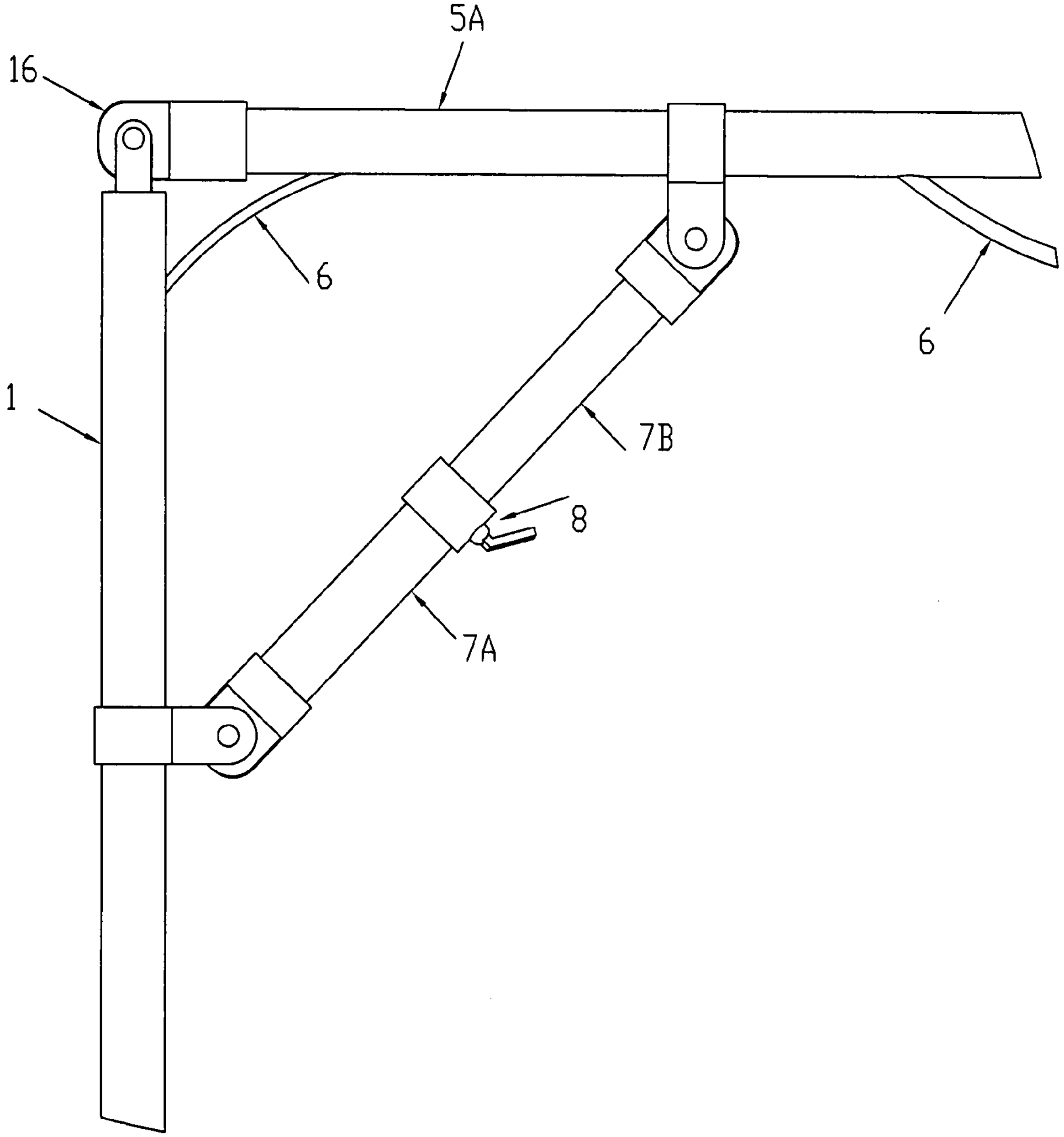
FIG. 7 shows a side view of the slanted support member and pivot pin connecting the vertical support member and horizontal support member.
Figure 8:
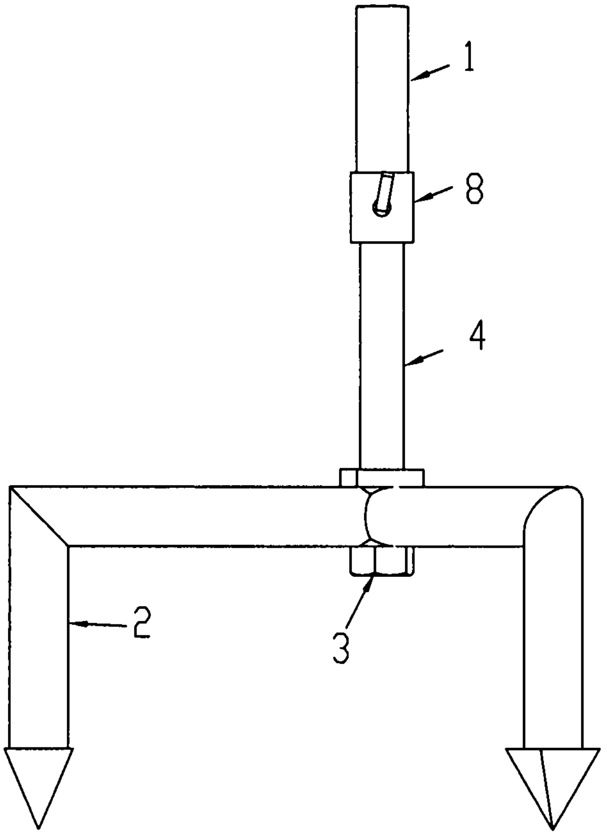
FIG. 8 shows the sprinkler system base in its preferred embodiment.
Figure 9:
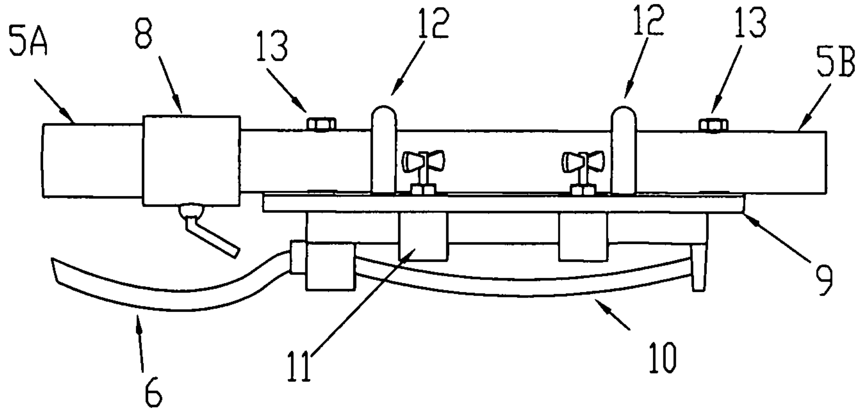
FIG. 9 shows a side view of the sprinkler support base in its preferred embodiment.
Figure 10:
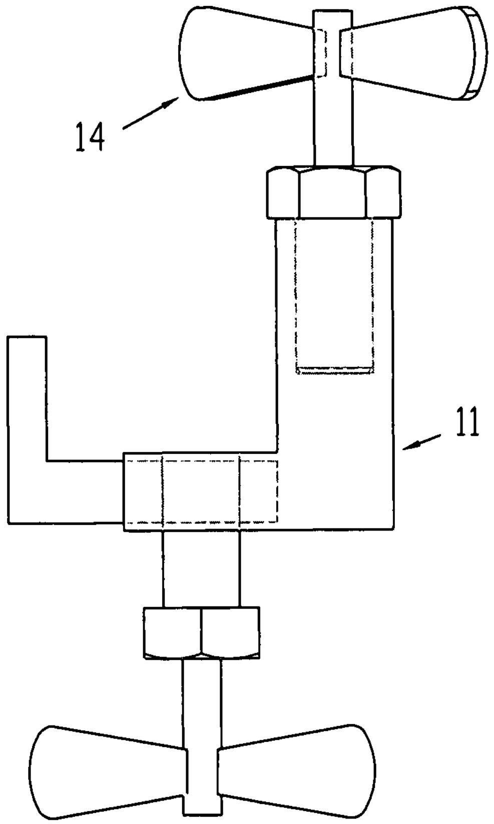
FIG. 10 shows a side view of the sprinkler support base J-clamp and clamp down nuts.
Figure 11:
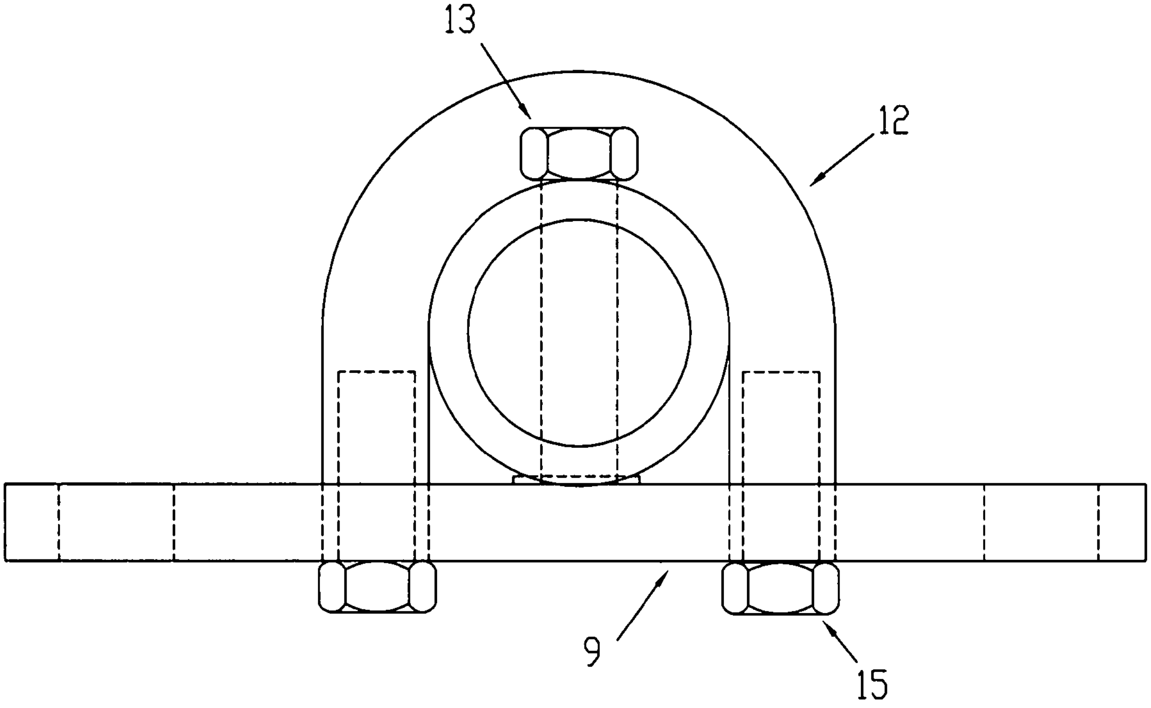
FIG. 11 shows a side view of the sprinkler support base and u-bolt attachment.
Figure 12:
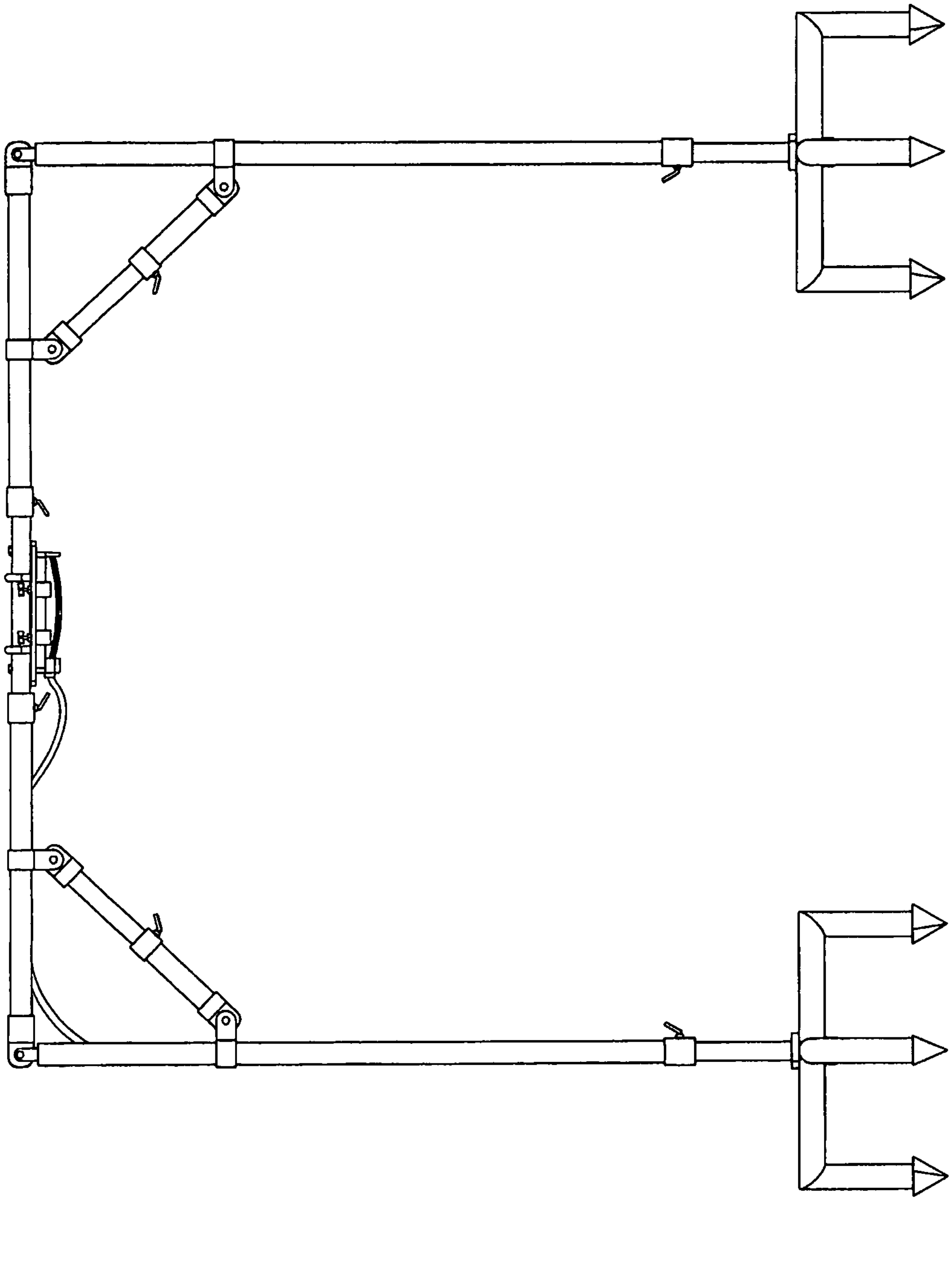
FIG. 12 shows a side view of an alternate embodiment of the invention utilizing tandem frames.
Figure 14:
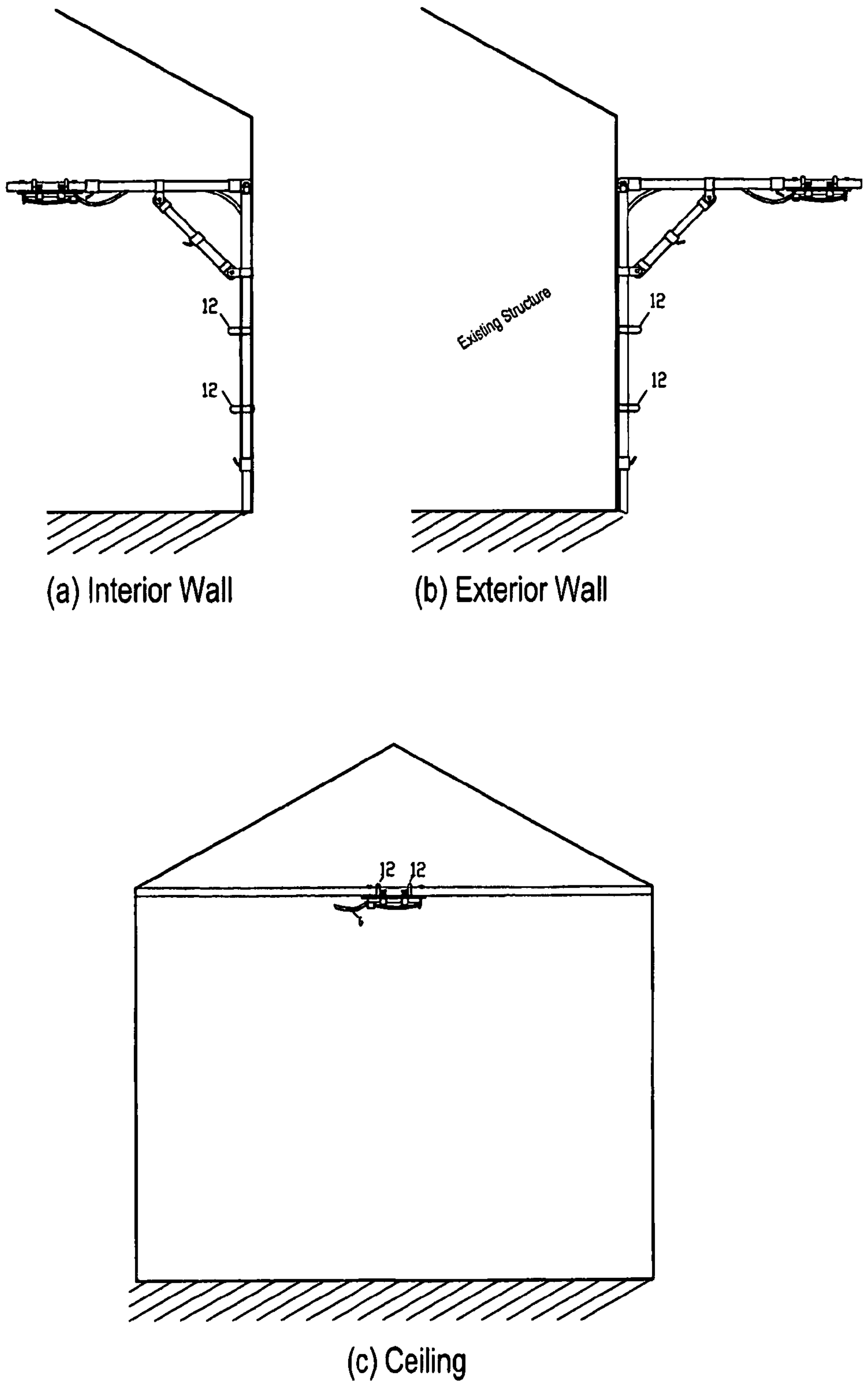
FIG. 14 shows side views of three alternate embodiments of the invention, with the sprinkler mounted on an interior wall, an exterior wall, and a ceiling.
Figure 15:
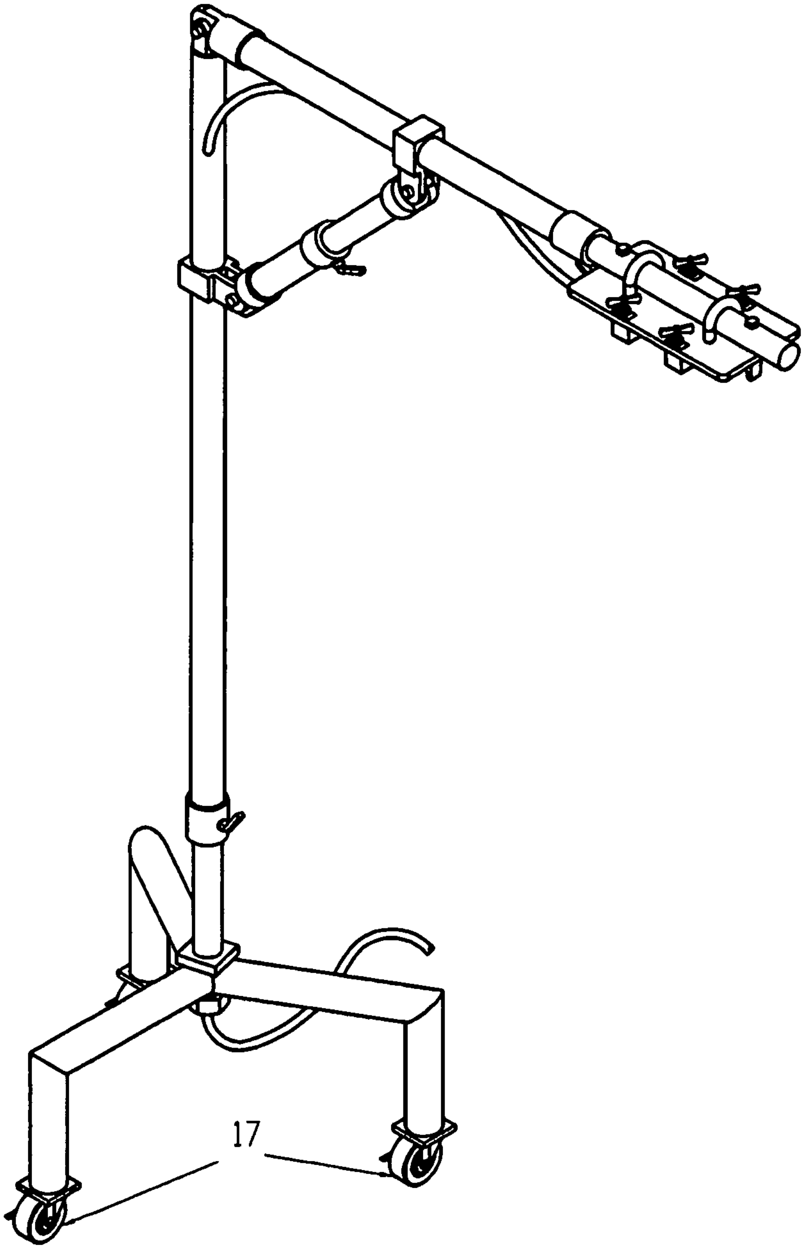
FIG. 15 shows an isometric view of the invention, with the sprinkler system mounted on wheels.

A preferred embodiment of the present invention is illustrated in FIG. 1 (isometric view) and FIG. 2 (exploded isometric view), FIG. 3 (side view), FIG. 4 (front view), FIG. 5 (side view of the adjustable vertical support member), FIG. 6 (side view of adjustable horizontal support member), FIG. 7 (side view of slanted support member), FIG. 8 (sprinkler system base), FIG. 9 (side view of sprinkler support base), FIG. 10 (side view of sprinkler support base J-clamp and clamp down nuts), and FIG. 11 (side view of sprinkler support base and U-bolt attachment). Alternate embodiments are shown in FIG. 12 (side view of inverted-sprinkler system utilizing tandem frames), FIG. 13 (isometric view of sprinkler attached directly to the adjustable horizontal support member), FIG. 14 (side views of the sprinkler mounted on an interior wall, an exterior wall, and a ceiling), and FIG. 15 (isometric view of the sprinkler system mounted on wheels).

The inverted-sprinkler system depicted is constructed of durable and lightweight material. In its preferred embodiment, the inverted-sprinkler system is made of hard plastic. However, it can consist of any other durable and lightweight material suited for fabrication into a weather-proof stand, including aluminum, lightweight metal alloys, fiberglass, or laminates. In its preferred embodiment, the inverted-sprinkler system is comprised of vertical and horizontal support members through which residential or commercial hose is internally contained. Alternatively, the hose may be externally supported by the vertical and horizontal support members.

As shown in the preferred embodiment, the proximal end of the vertical support member 1 (FIG. 2, 3, 4, 5, 7, 8) is coupled to a base connection member 4 (FIG. 2, 3, 5, 8). The base connection member 4 (FIG. 2, 3, 5, 8) is seated into a sprinkler system base 2 (FIG. 2, 3, 8). In its preferred embodiment, the sprinkler system base is a cylindrical tripod having three offsetting cylindrical ground stakes to secure the water sprinkler system to the surface. A hose hub 3 (FIG. 2, 8) is situated beneath the center of the sprinkler system base 2 (FIG. 2, 3, 8) for the connection of a garden or commercial hose to the bottom of the device. The hose hub 3 (FIG. 2, 8) is threaded into the base connector member 4 (FIG. 2, 3, 5, 8). In other embodiments, the sprinkler support base may be formed to take other stable geometric shapes (e. g. squares, circles) and may employ weights, instead of stakes, to support the system or wheels to make the system even more mobile.

An adjustable horizontal support member 5A (FIG. 2, 3, 6, 7, 9) and 5B (FIG. 2, 3, 6, 9, 13) is affixed to the vertical support member 1 (FIG. 2, 3, 4, 5, 7, 8) as shown by means of a pivot pin and tongue and groove plates 16 (FIG. 2, 3, 7). In its preferred embodiment, a length of hose 6 (FIG. 2, 3, 7, 9, 13) is contained within portions of the vertical and horizontal support members as shown.

The adjustable horizontal support member 5A (FIG. 2, 3, 6, 7, 9) and 5B (FIG. 2, 3, 6, 9, 13) also is affixed to the vertical support member 1 (FIG. 2, 3, 4, 5, 7, 8) by an adjustable slanted support member 7A (FIG. 2, 3, 7) and 7B (FIG. 2, 3, 7). The adjustable slanted support member 7A (FIG. 2, 3, 7) and 7B (FIG. 2, 3, 7) is adjustable in length to allow the adjustable horizontal support member to rotate about the pivot pin at plurality of angles. In other embodiments, the adjustable slanted support member 7A (FIG. 2, 3, 7) and 7B (FIG. 2, 3, 7) and pivot pin and tongue and groove plates 16 (FIG. 2, 3, 7) may be replaced with a fixed and non-adjustable connector (e.g. 90° elbow). The tubing in the vertical support member 1 (FIG. 2, 3, 4, 5, 7, 8) and base connection member 4 (FIG. 2, 3, 5, 8); the adjustable horizontal support member 5A (FIG. 2, 3, 6, 7, 9) and 5B (FIG. 2, 3, 6, 9, 13); and the adjustable slanted support member 7A (FIG. 2, 3, 7) and 7B (FIG. 2, 3, 7) is of two diameters to allow them to retract and extend telescopically. A telescopic locking device 8 (FIG. 2, 3, 4, 5, 6, 7, 8, 9, 13) is located where the smaller and larger diameters of tubing insert into one another. It may be hand fastened or loosened to allow for the telescopic expansion or retraction of the vertical support member, the adjustable horizontal support member, and/or the adjustable slanted support member, as needed. In addition, the vertical support member 1 (FIG. 2, 3, 4, 5, 7, 8) and the adjustable horizontal support member 5B (FIG. 2, 3, 6, 7, 9, 13) may be rotated axially where the smaller and larger diameters of tubing connect at the telescopic locking device 8 (FIG. 2, 3, 4, 5, 6, 7, 8, 9, 13). The sleeves surrounding the vertical support member 1 (FIG. 2, 3, 4, 5, 7, 8) and the adjustable horizontal support member 5A (FIG. 2, 3, 6, 7, 9) at either end of the adjustable slanted support member 7A (FIG. 2, 3, 7) and 7B (FIG. 2, 3, 7) have a diameter sufficiently wide to allow this axial rotation.

Affixed to the distal end of the horizontal support member is a sprinkler support base 9 (FIG. 2, 3, 4, 9, 11, 12). In its preferred embodiment, the sprinkler support base is comprised of a rectangular plate 9 (FIG. 2, 3, 4, 9, 11, 12) used to secure an inverted sprinkler 10 (FIG. 2, 3, 4, 9, 13). Sprinkler support base J-clamps 11 (FIG. 2, 3, 4, 9, 10) are used with clamp down nuts 14 (FIG. 2, 4, 10) to lock and unlock the sprinkler into its inverted position. The sprinkler support base 9 (FIG. 2, 3, 4, 9, 11, 12) is secured to the adjustable horizontal support member 5B (FIG. 2, 3, 6, 9, 13) by two U-bolt attachments 12 (FIG. 2, 3, 4, 9, 11, 14). Two horizontal elevation knobs 13 (FIG. 2, 9, 11) are used to make fine adjustments to the angle between the sprinkler support base 9 (FIG. 2, 3, 4, 9, 11, 12) and the horizontal support member 5B (FIG. 2, 3, 6, 9, 13).

In an alternate embodiment, the sprinkler support base 9 (FIG. 2, 3, 4, 9, 11, 12) is further affixed, as shown on FIG. 12, to tandem frames, each having an adjustable horizontal support member, a base support member, a vertical support member, an adjustable slanted support member, sprinkler support base, each of the said support members further having the adjustable features previously described. In another embodiment, an inverted sprinkler 10 (FIG. 2, 3, 4, 9, 13) is attached, as shown on FIG. 13, directly to the horizontal support member 5B (FIG. 2, 3, 6, 9, 13). In yet another embodiment, U-bolt attachments 12 (FIG. 14) are used to secure the sprinkler support members to an external structure such as a wall or a ceiling. Finally, in another embodiment, the sprinkler system is stably mounted on wheels 17 (FIG. 15) for mobility.

Advantages

From the description above, a number of advantages of the inverted-sprinkler system become evident:

a) The system is. compact and portable.

b) The system allows both commercial and amateur horticulturalists to quickly set up an elevated irrigation system to achieve direct watering or application of other fluids from above the coverage area.

c) The system allows a user to adjust the elevation and angular orientation of the system to increase or decrease coverage area and watering intensity.

d) The system allows a user to adjust the angle of the horizontal support member to assure uniform application rates in circumstances such as irrigating non-level surfaces.

e) The system allows for the complete inversion of a plurality of sprinklers such that irrigation is uniform and natural (like rain).

f) The base allows for easy movement and relocation of the system.

g) The angle between the sprinkler support base and the horizontal support member may be finely adjusted to create exactly and uniform sprinkler coverage areas.

h) The vertical and horizontal support members may be lengthened or shortened as needed. This feature allows the system to be located just above the desired coverage area thereby reducing wind drift of fluid during sprinkling.

i) The vertical and horizontal support members may be rotated axially as needed.

j) The system allows a user to make further adjustments using the locking and deflecting mechanisms indigenous to the type of sprinkler being inverted (e. g. wave-type, impulse-type, and pulsating-type).

h) Fluid pressure may be varied to adjust the flow rate and coverage area.

Figure 13:
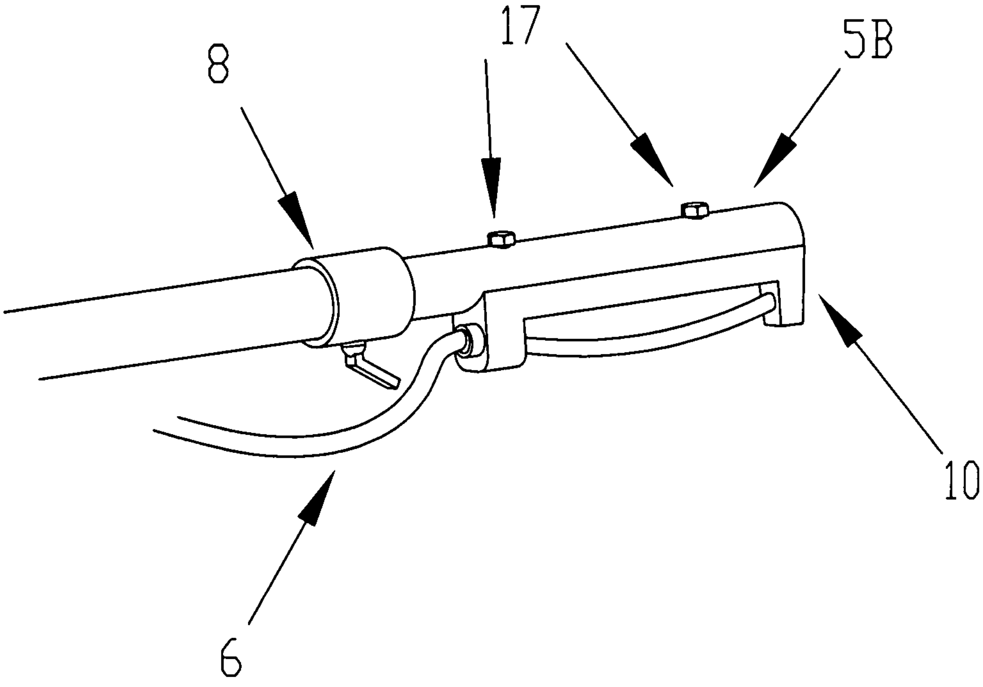
FIG. 13 shows an isometric view of an alternate embodiment of the invention with sprinkler attached directly to the adjustable horizontal support member.

Although the description above contains many specifications, these should not be construed as limiting the scope of the invention, but merely as providing illustrations of preferred embodiments of this invention. For example, the system can have many dimensions; the support members and base members can be made of aluminum, lightweight metal, alloys, fiberglass or laminates; the interior hose can be eliminated and a garden house secured to the vertical and horizontal members with exterior fasteners; the support members may take shapes other than cylindrical; the sprinkler support base may take shapes other than rectangular; all types of sprinklers may be inverted; the telescopic member locking devices may be replaced with other types of locking devices (e. g. slides and fasteners); the telescopic member locking devices may be fixed to certain heights and lengths; the sprinkler support base may be affixed in tandem to counterpart frames, each having an adjustable horizontal support member, a base support member, an adjustable slanted support member, and a sprinkler support base to give the system additional support, a reduced propensity to tip, and wider areas of coverage; the tandem counterpart frame embodiment may be utilized to affix more than one sprinkler support base; the sprinkler support base may be eliminated and a plurality of sprinklers (e.g. wave, rotary, oscillating, impulse, etc.) may be inverted and secured from the distal end of the adjustable horizontal support member by other fastening means (e. g. a coupler to thread said plurality of sprinkler directly to said distal end) as shown in FIG. 13; an inverted sprinkler and horizontal support member 5B (FIG. 2, 3, 6, 9, 13) can be-manufactured as one unit that can slide into an internal hose and telescopic locking device 8 (FIG. 2, 3, 4, 5, 6, 7, 8, 9, 13); the pivot pin and tongue and grove plates and adjustable slanted support member may be replaced by other non-adjustable fittings (e.g. fixed 90° elbows); the sprinkler support base only, may be secured to the interior of greenhouses or other external structures from above using a plurality of fastening means (e. g. wire, clamps, tie-rods); the invention, with sprinkler support base detached, may be secured to the interior of greenhouses or other external structures using wall mounts; J-clamps and U-bolt attachments may be replaced with other fasteners (e. g. hose clamps, U-clamps, and tie-rods); a hose timer may be used to automatically control the application of fluids. Flow pattern can be further adjusted by blocking (or increasing) the number of holes through which water is discharged by the sprinkler, using a sprinkler that uses a pattern select feature (Heren and Breedlove, U.S. Pat. No. 7,252,246 B2 (2007)) or a sprinkler with perforated spray hose that is selectively flexed to produce a variable water spray pattern (Abrahamsen and Spector, U.S. Pat. No. 4,245,786 (1981)). Furthermore, if a larger coverage area is required, the embodiment shown in FIG. 12 can be duplicated (repeated) as many times to cover the desired coverage area. Thus the scope of the invention should be determined by the appended claims and their legal equivalents rather than by the examples given.

What is claimed

1. An adjustable inverted-sprinkler system comprising:

a sprinkler support base fashioned to accept plurality of sprinklers in a generally inverted orientation;

coupling means for attaching and securing a plurality of sprinklers in a generally inverted orientation;

a frame coupled to said sprinkler support base at an adjustable horizontal support member, said frame having a base connection member, a telescopically height adjustable and axially rotatable vertical support member, pivotally connected to a telescopically length adjustable and axially rotatable horizontal support member, and a telescopically length adjustable slanted support member;

means for adjusting the angle between said sprinkler support base and said adjustable horizontal support member, wherein the means for adjusting the angle comprises elevation knobs;

a sprinkler system base and hose hub coupled to said frame;

coupling means for attaching the hose hub to said base connection member.

2. The adjustable inverted-sprinkler system of claim 1, said frame having tandem counterpart sets of a base connection member, a telescopically height adjustable and axially rotatable vertical support member, pivotally connected to a telescopically length adjustable and axially rotatable horizontal support member, and a telescopically length adjustable slanted support member.

3. The adjustable inverted-sprinkler system of claim 1 or 2, wherein said sprinkler system base is detached and the vertical support member(s) is/(are) attached to another support structure external to the system, for example, an interior wall, an exterior wall, a ceiling, a pole, etc.

4. The adjustable inverted-sprinkler system of claims 1 or 2, wherein said sprinkler system base comprises a plurality of legs disposed in a tripod arrangement.

5. The adjustable inverted-sprinkler system of claims 1 or 2, wherein said sprinkler system base comprises of a plurality of stakes disposed in a tripod arrangement.

6. The adjustable inverted-sprinkler system of claim 1 or 2, wherein a plurality of legs may be stably mounted on wheels for mobility.

7. The adjustable inverted-sprinkler system of claim 1 or 2, wherein said flame contains a length of hose generally contained within the vertical and horizontal support members.

8. The adjustable inverted-sprinkler system of claims 1 or 2, said flame comprising a vertical support member connected to a horizontal support member at a right angle.

* * * * *